(12) United States Patent
Leifer et al.

(10) Patent No.: US 7,958,885 B2
(45) Date of Patent: *Jun. 14, 2011

(54) METHOD FOR OPERATING AN ACTIVE THERMAL ENERGY STORAGE SYSTEM

(75) Inventors: Leslie Leifer, Hancock, MI (US); Jay D. Rowe, Hancock, MI (US)

(73) Assignee: ELCAL Research LLC, Wilmington, DE (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/212,822

(22) Filed: Sep. 18, 2008

(65) Prior Publication Data

US 2009/0007900 A1 Jan. 8, 2009

Related U.S. Application Data

(63) Continuation of application No. 11/818,401, filed on Jun. 13, 2007, now Pat. No. 7,441,558.

(60) Provisional application No. 60/852,844, filed on Oct. 19, 2006.

(51) Int. Cl.
*F24H 7/00* (2006.01)
(52) U.S. Cl. .................. 126/400; 126/617; 392/496
(58) Field of Classification Search .................. 126/617, 126/400; 122/13.01; 165/121; 219/50
See application file for complete search history.

(56) References Cited

U.S. PATENT DOCUMENTS

| 3,976,584 | A | 8/1976 | Leifer |
| 4,143,642 | A | 3/1979 | Beaulieu |
| 6,712,069 | B1 | 3/2004 | Spangler |
| 7,441,558 | B2 * | 10/2008 | Leifer et al. .................. 126/617 |

OTHER PUBLICATIONS

Form PCT/ISA/210 International Search Report for International Application No. PCT/US07/75322, dated Jun. 17, 2008.
Form PCT/ISA/237 Written Opinion of the International Searching Authority for International Application No. PCT/US07/75322, dated Jun. 17, 2008.

* cited by examiner

*Primary Examiner* — Alfred Basichas
(74) *Attorney, Agent, or Firm* — Duane Morris LLP

(57) ABSTRACT

An active thermal energy storage system is disclosed which uses an energy storage material that is stable at atmospheric pressure and temperature and has a melting point higher than 32 degrees F. This energy storage material is held within a storage tank and used as an energy storage source, from which a heat transfer system (e.g., a heat pump) can draw to provide heating of residential or commercial buildings and associated hot water. The energy storage material may also accept waste heat from a conventional air conditioning loop, and may store such heat until needed. The system may be supplemented by a solar panel system that can be used to collect energy during daylight hours, storing the collected energy in the energy storage material. The stored energy may then be used during the evening hours to heat recirculation air for a building in which the system is installed.

23 Claims, 11 Drawing Sheets (ATESS Heating System) Test Results (BTU)

| Temp of Outside Air °F | | Day | Heat to Room #1 | Heat to Room #2 | | Main Heating System | ATESS Heating System | | | | | | | | | | |
|---|---|---|---|---|---|---|---|---|---|---|---|---|---|---|---|---|---|
| Max | Min | | | | | | | Evening Off Peak Electric to TESM | | Day Solar Electric to TESM | | Heat Pump Compression TESM | | Motor Loss & Extra Room Heat Demand | | ATESS Controls | |
| - | - | 1 | 15,940 | 15,700 | = | 15,700 | | | | | | | | | | | |
| - | - | 2 | 14,440 | 14,790 | = | 14,790 | | | | | | | | | | | |
| - | - | 3 | 15,220 | 15,100 | = | 15,100 | | | | | | | | | | | |
| - | - | 4 | 13,690 | 15,319 | = | 0 | + | 4,729 | + | 4,729 | + | 2,931 | + | 1,742 | + | 1,186 | 15,317 |
| 41 | 32 | 5 | 12,770 | 15,865 | = | 0 | + | 5,120 | + | 5,120 | + | 3,174 | + | 1,265 | + | 1,186 | 15,865 |
| 36 | 31 | 6 | 14,070 | 17,165 | = | 0 | + | 5,564 | + | 5,564 | + | 3,449 | + | 1,402 | + | 1,186 | 17,165 |
| 35 | 30 | 7 | 15,060 | 19,549 | = | 0 | + | 5,275 | + | 5,275 | + | 3,270 | + | 4,543 | + | 1,186 | 19,549 |
| 37 | 29 | 8 | 16,940 | 18,126 | = | 0 | + | 5,086 | + | 5,086 | + | 3,153 | + | 3,615 | + | 1,186 | 18,126 |
| 37 | 24 | 9 | 15,710 | 18,123 | = | 0 | + | 5,462 | + | 5,462 | + | 3,386 | + | 2,627 | + | 1,186 | 18,123 |
| 43 | 26 | 10 | 14,340 | 16,685 | = | 0 | + | 5,462 | + | 5,462 | + | 3,386 | + | 1,189 | + | 1,186 | 16,685 |
| 47 | 26 | 11 | 15,220 | 19,275 | = | 0 | + | 5,581 | + | 5,581 | + | 3,400 | + | 3,527 | + | 1,186 | 19,275 |
| 27 | 13 | 12 | 20,351 | 21,887 | = | 0 | + | 5,618 | + | 5,618 | + | 3,483 | + | 5,982 | + | 1,186 | 21,887 |
| 23 | 12 | 13 | 20,368 | 23,079 | = | 0 | + | 5,778 | + | 5,778 | + | 3,582 | + | 6,755 | + | 1,186 | 23,079 |
| 38 | 24 | 14 | 15,996 | 19,675 | = | 0 | + | 5,976 | + | 5,976 | + | 3,701 | + | 2,832 | + | 1,186 | 19,671 |

*Fig. 8*

| Optimum Day Test Results | | | | | | | | | | | | | |
|---|---|---|---|---|---|---|---|---|---|---|---|---|---|
| | | | | | ATESS Heating System | | | | | | | | |
| Hour | Heat to Duplex Room #1 (BTU) | Heat to Duplex Room #2 (BTU) | | Main Heating System (BTU) | | Evening Off Peak Electric to TESM (BTU) | | Day Solar Electric to TESM (BTU) | | Heat Pump Compression TESM | | Motor Loss & Extra Room Heat Demand | ATESS Controls |
| 1 | 597 | 706 | = | 0 | + | 0 | + | 0 | + | | + | | |
| 2 | 597 | 706 | = | 0 | + | 0 | + | 0 | + | 141 | + | 60 | 49 |
| 3 | 597 | 706 | = | 0 | + | 0 | + | 0 | + | 141 | + | 60 | 49 |
| 4 | 597 | 706 | = | 0 | + | 0 | + | 0 | + | 141 | + | 60 | 49 |
| 5 | 597 | 706 | = | 0 | + | 1,366 | + | 0 | + | 141 | + | 60 | 49 |
| 6 | 597 | 706 | = | 0 | + | 1,366 | + | 0 | + | 141 | + | 60 | 49 |
| 7 | 597 | 706 | = | 0 | + | 1,366 | + | 0 | + | 141 | + | 60 | 49 |
| 8 | 597 | 706 | = | 0 | + | 1,366 | + | 0 | + | 141 | + | 60 | 49 |
| 9 | 597 | 706 | = | 0 | + | 0 | + | 0 | + | 141 | + | 60 | 49 |
| 10 | 597 | 706 | = | 0 | + | 0 | + | 0 | + | 141 | + | 60 | 49 |
| 11 | 597 | 706 | = | 0 | + | 0 | + | 0 | + | 141 | + | 60 | 49 |
| 12 | 597 | 706 | = | 0 | + | 0 | + | 0 | + | 141 | + | 60 | 49 |
| 13 | 597 | 706 | = | 0 | + | 0 | + | 0 | + | 141 | + | 60 | 49 |
| 14 | 597 | 706 | = | 0 | + | 0 | + | 0 | + | 141 | + | 60 | 49 |
| 15 | 597 | 706 | = | 0 | + | 0 | + | 0 | + | 141 | + | 60 | 49 |
| 16 | 597 | 706 | = | 0 | + | 0 | + | 0 | + | 141 | + | 60 | 49 |
| 17 | 597 | 706 | = | 0 | + | 0 | + | 0 | + | 141 | + | 60 | 49 |
| 18 | 597 | 706 | = | 0 | + | 0 | + | 0 | + | 141 | + | 60 | 49 |
| 19 | 597 | 706 | = | 0 | + | 0 | + | 1,366 | + | 141 | + | 60 | 49 |
| 20 | 597 | 706 | = | 0 | + | 0 | + | 1,366 | + | 141 | + | 60 | 49 |
| 21 | 597 | 706 | = | 0 | + | 0 | + | 1,366 | + | 141 | + | 60 | 49 |
| 22 | 597 | 706 | = | 0 | + | 0 | + | 1,366 | + | 141 | + | 60 | 49 |
| 23 | 597 | 706 | = | 0 | + | 0 | + | 0 | + | 141 | + | 60 | 49 |
| 24 | 597 | 706 | = | 0 | + | 0 | + | 0 | + | 141 | + | 60 | 49 |
| Total | 14,328 | 16,944 | | 0 | | 5,464 | | 5,464 | | 3,384 | | 1,440 | 1,176 |
| | | | | | | | | | | | | | 16,928 |

*Fig. 9*

(ATESS) Test Results (BTU per Day)

| | Heat Required BTU/Per Day | (ATESS) Night Off Peak Electricity & Daytime Solar | | |
|---|---|---|---|---|
| | | Evening Off Peak Elec Heat to TESM | Daytime Solar Elec Heat to TESM | Heat Pump Comp and Motor Loss |
| Test Site 32sq ft | 14,328 | 5,464 | 5,464 | 4,824 |
| Residence 1600sq ft (ratio 50:1) | 716,400 | 273,200 | 273,200 | 170,000 |

*Fig. 10A*

Global Warming Effects in an Annual 125 Day Heating Season

| References: | BTU/Gallon | Gallons/Heating Season | Carbon Emmissions | CO2 Emmissions |
|---|---|---|---|---|
| Fuel Oil | 148,000 | 711 | 3831lbs | 14,060lbs |
| LPG | 91,600 | 1,150 | 2927lbs | 10,742lbs |
| ATESS | N/A | N/A | 0lbs | 0lbs |

*Fig. 10C*

Limited Energy Sources

(1) Night Off Peak Electricity & Daytime Solar (ATESS)

| Conventional Heating Fuel Source | Conventional System Energy Source | Evening Off Peak Elec Heat to TESM $0.03/KWH | Daytime Solar Elec Heat to TESM $0.00/KWH | Heat Pump Comp and Motor Loss $0.12/KWH | Winter Annual Heating Costs $$ Per Year Conventional Heating Systems | ATESS Heating System |
|---|---|---|---|---|---|---|
| Fuel Oil @ $2.55/gal 85% Combustion eff. | 5.69 gpd 14.51 $/day | 80 kwhrs 2.40 $/day | 80 kwhrs 0 $/day | 49.8 kwhrs 5.98 $/day | $1,813 | $1,048 |
| LPG @ $1.86/gal 85% Combustion eff. | 9.2 gpd 15.46 $/day | 80 kwhrs 2.40 $/day | 80 kwhrs 0 $/day | 49.8 kwhrs 5.98 $/day | $1,932 | $1,048 |

(2) Night Off Peak Electricity Only (ATESS)

| Conventional Heating Fuel Source | Conventional System Energy Source | Evening Off Peak Elec Heat to TESM $0.03/KWH | Daytime Solar Elec Heat to TESM $0.00/KWH | Heat Pump Comp and Motor Loss $0.12/KWH | Winter Annual Heating Costs $$ Per Year Conventional Heating Systems | ATESS Heating System |
|---|---|---|---|---|---|---|
| Fuel Oil @ $2.55/gal 85% Combustion eff. | 5.69 gpd 14.51 $/day | 160 kwhrs 4.80 $/day | 0 kwhrs 0 $/day | 49.8 kwhrs 5.98 $/day | $1,813 | $1,348 |
| LPG @ $1.86/gal 85% Combustion eff. | 9.2 gpd 15.46 $/day | 160 kwhrs 4.80 $/day | 0 kwhrs 0 $/day | 49.8 kwhrs 5.98 $/day | $1,932 | $1,348 |

(3) Daytime Solar Energy Only (ATESS)

| Conventional Heating Fuel Source | Conventional System Energy Source | Evening Off Peak Elec Heat to TESM $0.03/KWH | Daytime Solar Elec Heat to TESM $0.00/KWH | Heat Pump Comp and Motor Loss $0.12/KWH | Winter Annual Heating Costs $$ Per Year Conventional Heating Systems | ATESS Heating System |
|---|---|---|---|---|---|---|
| Fuel Oil @ $2.55/gal 85% Combustion eff. | 5.69 gpd 14.51 $/day | 0 kwhrs 0 $/day | 160 kwhrs 0 $/day | 49.8 kwhrs 5.98 $/day | $1,813 | $748 |
| LPG @ $1.86/gal 85% Combustion eff. | 9.2 gpd 15.46 $/day | 0 kwhrs 0 $/day | 160 kwhrs 0 $/day | 49.8 kwhrs 5.98 $/day | $1,932 | $748 |

*Fig. 10B*

METHOD FOR OPERATING AN ACTIVE THERMAL ENERGY STORAGE SYSTEM

CROSS-REFERENCE TO RELATED APPLICATIONS

This application is a continuation of co-pending U.S. non-provisional patent application Ser. No. 11/818,401, filed Jun. 13, 2007, which claims priority from U.S. provisional patent application Ser. No. 60/852,844, filed Oct. 19, 2006, the entirety of which applications are incorporated herein by reference.

FIELD OF THE INVENTION

The invention relates to a system for heating and cooling of residential and commercial building spaces and hot water systems, and more particularly to an active heat transfer system used for use in efficiently controlling air and water temperature in commercial buildings and residences.

BACKGROUND OF THE INVENTION

The electrical energy generation and distribution networks in the United States are currently stressed to the limit by peak demands during daytime hours. Quite expectedly, the demands of the industrial sector, commercial and residential air conditioning and water heating are highest during the daytime hours. During the off peak, late evening and night time hours, the opposite is true, and there normally is excess electrical power available which is not needed in the local power grid.

Using nationwide transmission power lines, the power generation and distribution grid is used to transfer excess power to other grids that require it. This is a form of load leveling that is aimed at maintaining the coal, oil or nuclear power generation plants at a level, constant, load. The problem with such a load leveling scheme is that costs are high, due to the costs of transmission and line losses inherent in cross-country transmission to other power grids.

Further, coal fired electric generating plants in the United States emit carbon dioxide and other pollutants to the atmosphere in proportion to peak electric daytime demands. The peak daytime demands determine the amount of excess off peak evening power that must be transported (again, by costly high voltage power transmission lines), to a far away electric grid that can use the power for their peak power shortage needs, or other use.

It would be advantageous to provide a system that enables local off-peak utilization of the excess power from the local grid, thus reducing costs associated with peak production, pollution associated with that peak production, and also reducing costs associated with transmission of excess power over long distances.

SUMMARY OF THE INVENTION

A system is disclosed for storing excess local grid power produced during off peak hours (e.g., night, holidays, etc.), for use in controlling heating/cooling systems in residential and commercial buildings during peak (e.g., daytime) periods. An active thermal energy storage system (hereinafter referred to as "ATESS") is disclosed for storing this excess local grid off peak power in a thermal energy storage material, such as that described in U.S. Pat. No. 3,976,584 to Leifer, and for using the stored energy to control air and water temperatures in residential dwelling and/or commercial buildings during peak energy periods. It will be appreciated, however, that the ATESS may be used to provide energy for heating/cooling at any time during a 24 hour day, and not just during the peak energy periods.

The ATESS may enable local use of off peak excess electrical energy, thus reducing the need for oil and natural gas systems previously required for residential dwelling or commercial building heating and/or water heating needs. Thus, the invention relates to the active transfer of thermal heat energy obtained from any of a variety of natural energy sources (e.g., solar, electrical, wind, gas, oil, etc.) by an active method and then storing that thermal heat energy in a thermal energy storage material, such as one of the materials described in U.S. Pat. No. 3,976,584 to Leifer, the entire contents of which patent is incorporated herein. The thermal energy storage material may be contained in an appropriate tank or storage vessel (which will be described in greater detail below), and the thermal energy stored in the thermal energy storage material may then be transferred by an active heat transfer system (e.g., a heat pump) to a point of use location within a residential home or commercial building, when needed for air and/or water heating at any time during a 24 hour day.

The ATESS operates on the principal of collecting limited available input energy from any and all sources (e.g., solar, electricity, wind, oil, gas) and storing that energy in a thermal energy storage material until needed later. The energy stored in the thermal energy storage material may be removed by a heat transfer system (e.g., heat pump) to control the temperature of residential homes or commercial buildings, thus providing the heat energy requirements at any time during a 24 hour day. Hot water or other liquid heating needs can be met by use of a dual integrated or separate heat transfer (e.g., heat pump) system which can transfer the stored energy from the energy storage material as needed for such purpose.

In one example, systems exist for collecting solar energy from the sun's radiation only during the limited day time hours for use in home air or water heating needs. However, such systems can only provide this energy when the sun is available. During the evening hours or on cloudy days the residential dwelling and/or commercial building air and/or water heating energy needs must be obtained from or supplemented by other available sources of energy, such as oil, natural gas, wind or electrical energy. Thus, alternative sources of energy are required in order to satisfy the full 24 hours of energy needs. The ATESS functions to receive solar energy during daylight hours, and to store that energy in a thermal energy storage material for use at any time during a 24 hour period. Stored energy is then transferred to the area of need by an active heat transfer (e.g., heat pump) system. In this way, the ATESS can make solar energy available 24 hours a day, thus reducing the need for oil or natural gas for residential dwelling and/or commercial building heating and/or water heating energy needs.

In another example, during hot and humid summer months the ATESS can be used to remove heat energy from the air within a residential or commercial building, store that heat energy in the thermal energy storage material, and then make that heat energy available for use at any time during the day or night.

Currently residential dwellings and/or commercial buildings use air conditioning powered by electricity to remove heat from the air inside the dwellings and/or buildings. Electrical energy is required to remove the heat energy from the inside building room air to make it comfortable for human occupancy during hot humid days and nights. The ATESS can be configured so that the active heat transfer system (e.g., heat pump) removes heat from the air inside a building, and stores it in the thermal energy storage material. This stored waste heat, which is normally rejected to the outside atmosphere by typical air conditioning units, can then be used to heat the water used in the residential dwellings and/or commercial buildings. It can also be used to provide night time heating needs, as appropriate.

The ATESS will reduce markedly the daytime peak power electric demands on the electrical power grid and the electric generating equipment of the local power companies. The ATESS enables more efficient local use of energy from the local power grid, thus reducing or eliminating the need for oil and natural gas. Concurrent reductions in the emission of carbon dioxide and other pollutants, normally associated with energy production from oil or natural gas, would also be achieved.

An thermal energy storage system is disclosed, comprising a first tank for holding a quantity of water, a second tank having a quantity of thermal energy storage material disposed therein, the thermal energy storage material comprising a substantially solid clathrate having a melting point above 32 degrees Fahrenheit (F.), and a latent heat of fusion approaching that of water, and recirculation piping connecting the first and second tanks. The recirculation piping may be in fluid communication with an inner volume of said first tank, the recirculation piping further comprising a heating coil disposed within the second tank. Thusly arranged, heated water disposed in said first tank at a first time may be movable within said recirculation piping, and through said heating coil, to transfer heat from the heated water to the thermal energy storage material disposed within the second tank. Furthermore, cool water disposed in said first tank at a second time is movable within said recirculation piping, and through said heating coil, to transfer heat from said thermal energy storage material disposed within the second tank to the cool water.

A thermal energy storage system is disclosed, comprising a hot water tank for holding a quantity of water, a storage tank having a quantity of thermal energy storage material disposed therein, the thermal energy storage material comprising a substantially solid clathrate having a melting point above 32 degrees Fahrenheit (F.), and a piping loop connecting the hot water tank and the storage tank. The piping loop may be in fluid communication with an inner volume of said hot water tank, the piping loop further comprising a heating coil disposed within the storage tank. When a quantity of water in said hot water tank has a temperature greater than a temperature of said thermal energy storage material, said water is movable within said piping loop and heating coil to transfer heat from the water to the thermal energy storage material. When said quantity of water in said hot water tank has a temperature less than a temperature of said thermal energy storage material, said water is movable within said piping loop and heating coil to transfer heat from the thermal energy storage material to the water.

A thermal energy storage system, comprising a first tank, a second tank, and an air distribution system. The first tank may have a quantity of water disposed therein. The second tank may have a quantity of thermal energy storage material disposed therein. The thermal energy storage material may comprise a phase change material having a melting point above 32 degrees Fahrenheit (F.), and a latent heat of fusion approaching that of water. The first and second tanks may be connected by a recirculation loop for moving said water from said first tank through a first coil disposed within said second tank to transfer energy between said water and said thermal energy storage material. Said second tank and said air distribution system may be connected by an air conditioning loop for moving a first heat transfer fluid from a second coil disposed in said second tank to a third coil disposed in said air conditioning system to transfer energy between said thermal energy storage material and air passed over said third coil.

A thermal energy storage system is disclosed, comprising a first tank, a second tank, and a hot water radiator circulation system. The first tank may have a quantity of water disposed therein. The second tank may have a quantity of thermal energy storage material disposed therein, the thermal energy storage material comprising a phase change material having a melting point above 32 degrees Fahrenheit (F.), and a latent heat of fusion approaching that of water. The first and second tanks may be connected by a recirculation loop for moving said water from said first tank through a first coil disposed within said second tank to transfer energy between said water and said thermal energy storage material. The second tank and the hot water radiator circulation system may be connected by loop for moving a first heat transfer fluid from a second coil disposed in said second tank to a water coil disposed in said hot water radiator circulation system to transfer energy between said thermal energy storage material and water passed over said water coil.

BRIEF DESCRIPTION OF THE DRAWINGS

FIG. 8 is a tabular representation of the results of a 14 day test of the ATESS;

FIG. 9 is a tabular representation of the performance of the ATESS on an hourly basis throughout a 24-hour day; and FIGS. 10A-C are tabular representations of daily fuel oil and LPG (liquid propane gas) consumption for a residential home, including a comparison of the annual winter heating costs for fuel oil, LPG, and the ATESS heating system using off peak electric and daytime solar, all off peak electricity, and all daytime solar.

DETAILED DESCRIPTION

As previously noted, there are many sources of energy (e.g., solar, electrical, oil, gas, wind, etc.) which may be available for collection only during limited time periods during a 24 hour day. This is in contrast to the electrical, heating or cooling power needs associated with a residential or commercial building, which may vary during any given 24 hour period. The disclosed ATESS accommodates such limited availability of these energy sources and provides a steady source of energy, as needed, throughout a 24 hour period.

Figure 1:
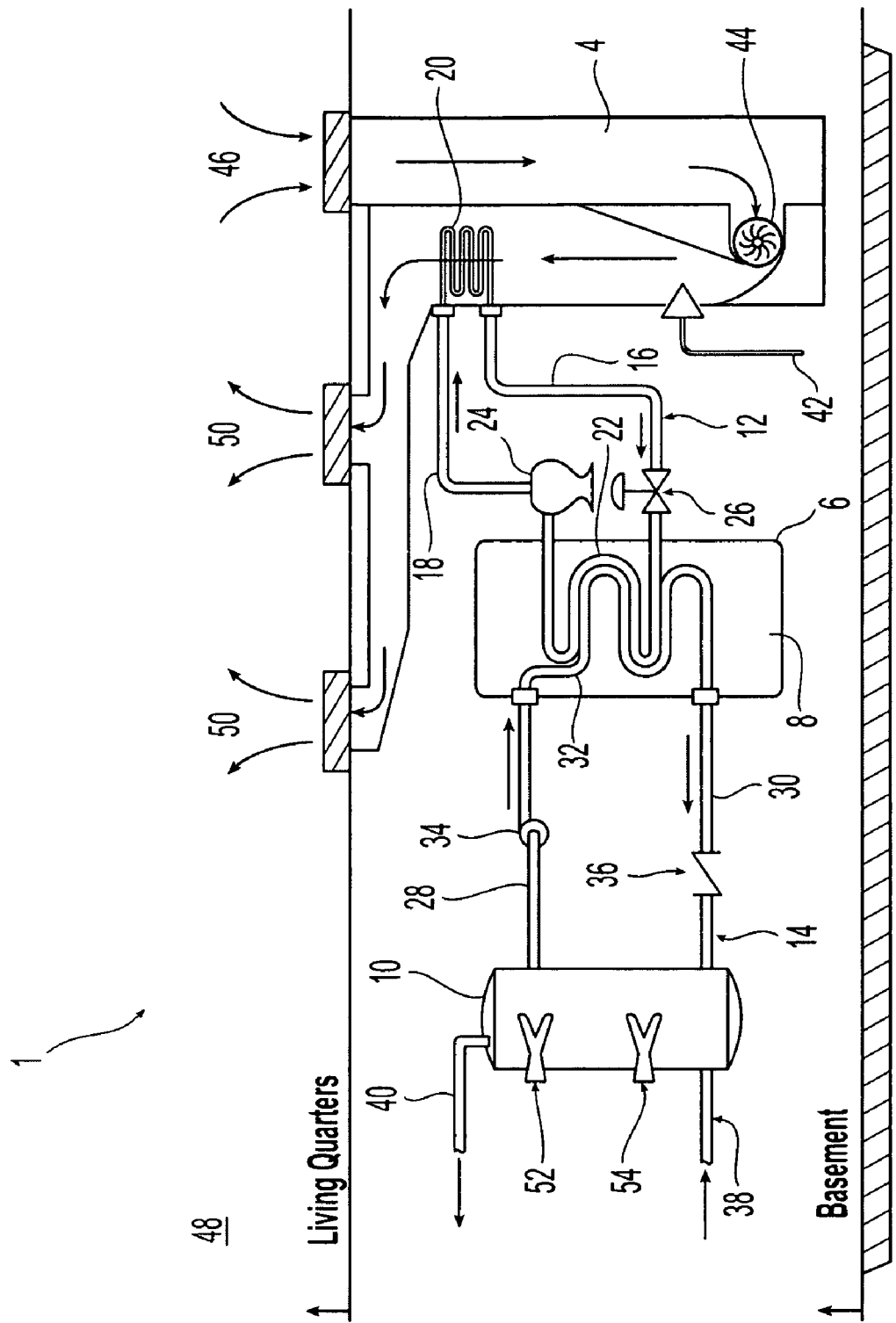
FIG. 1 shows the ATESS installed in a dwelling that has an oil or natural gas hot air furnace system.

Referring to FIG. 1, the ATESS 1 is shown installed in the basement area 2 of a dwelling having an oil or natural gas hot air furnace system 4. The ATESS 1 may comprise a storage tank 6 containing a quantity of thermal energy storage material 8, a hot water storage tank 10 for heating and distribution of hot water through the residence, and a connection 12 between the storage tank 6 and the furnace system 4 to allow the transfer of heat between the thermal energy storage material 8 and the furnace system 4. A connection 14 will also be provided between the hot water tank 10 and the storage tank 6 to allow the transfer of heat between the thermal energy storage material 8 contained in the storage tank 6 and the hot water from the hot water tank 10.

The connection 12 between the storage tank 6 and the furnace system 4 may comprise fluid supply and return piping 16, 18 which connect to opposite ends of a condenser coil 20 located within the furnace system 4. Likewise, the supply and return piping 16, 18 connect to opposite ends of an evaporator coil 22 located within the storage tank 6. The supply and return piping 16, 18 and condenser and evaporator coils 20, 22 thus form a closed loop for the movement of a heat transfer fluid between the furnace system 4 and the thermal energy storage material tank 6. The flow rate of the heat transfer fluid may be controlled by operation of a compressor 24 located in the return piping 18, and a control valve 26 located in the supply piping 16.

Likewise, the connection 14 between the thermal energy storage material tank 6 and the hot water tank 10 may comprise supply 28 and return 30 piping connected to a heating coil 32 disposed within the storage tank 6. Water is pumped through the supply and return piping 28, 30 by a circulation pump 34 located in the supply piping line. A check valve 36 disposed within the discharge piping protects against backflow of water through the return piping when the pump 34 is turned off. The hot water tank 10 may farther have a cold water supply line 38 for providing a constant source of water to the tank 10 for heating, and a hot water discharge line 40 for distributing the heated water throughout the residence.

The hot water tank 10 may further have one or more electrical resistance heaters 52, 54 to heat the water in the tank to a desired temperature using building electricity.

In operation, the water in the hot water tank 10 is heated to a desired temperature using one or more of the resistance heaters 52, 54. The heated water may then be pumped through the supply and return piping 28, 30 to heat the thermal energy storage material 8 contained in the thermal energy storage material tank 6. This heat transfer can occur until a desired amount of energy is contained in the thermal energy storage material 8.

Thereafter, the energy contained in the thermal energy storage material 8 can be transferred to the air 46 of the furnace system 4 via the fluid supply and return lines 16, 18. The heat transfer fluid contained in these lines may be warmed as it passes through the evaporator coil 22 and compressor 24. Energy contained in the heat transfer fluid is then transferred to the recirculating air 46 via the condenser coil 20, providing warm air 50 to be returned to the living space.

The energy in the thermal energy storage material 8 can also be used to transfer energy back to the water in the hot water tank 10, via the supply and return piping 28, 30 and recirculation pump 24. Thus, during off-peak periods (e.g., night time) the hot water system is used to transfer heat to the thermal energy storage material 8, allowing the storage of large quantities of heat during an otherwise light energy loading period. Thereafter, during peak loading periods (e.g., daytime), the heat can be transferred back to the hot water tank or to the furnace, as needed to heat the building air and/or water.

In addition to the condenser coil 20 arrangement, the furnace system 4 may comprises a traditional fuel supply 42, and a furnace air circulation fan 44 for drawing cold air 46 from the living space 48. The fan 44 causes the cold air 46 to flow over the condensing coil 20, and then circulates the heated air 50 throughout the living space 48. In one embodiment, where the living space thermostat is set to about 70 degrees F., the cold air 46 is at a temperature of about 65 degrees F., and the hot air 50 is at a temperature of about 75 degrees F.

One appropriate thermal energy storage material is that described in U.S. Pat. No. 3,976,584 to Leifer, the entire contents of which is incorporated by reference herein. The Leifer patent describes a clathrate material that is stable at atmospheric temperature and pressure, has a melting point higher than 32 degrees F., and has a relatively high specific heat and heat of fusion. Such a material absorbs heat until its temperature rises to its melting point. Because of its high heat of fusion, the thermal storage material can absorb a large quantity of heat per unit mass, making it a highly efficient means of energy storage. This is but one possible material that may be used as the thermal energy storage material 8, and other materials have properties that are expected to make them desirable for use as the thermal energy storage material 8. For example, materials such as imidazole, imidazolium chloride, derivatives of pyrrole, such as 2-acetyl pyrrole or tetra methyl pyrrole, or other like compounds may be suitable for use as thermal energy storage material 8. The results of testing of certain of these thermal energy storage materials are discussed in relation to FIGS. 8-10C. Materials other than those specifically tested and/or identified may be suitable as well, as will be appreciated by one of ordinary skill in the art.

The tank 6 employed to hold the thermal energy storage material will preferably be made of a material that is non-reacting when exposed to the particular thermal energy storage material 8 used in the ATESS. Thus, in one embodiment the tank 6 may be made from polyethylene material. Alternatively, the tank 6 may be made from glass or non-reacting material or may be provided with a glass or other non-reacting material lining.

Like the tank interior, the external surfaces of lines 22, 32 that run within the tank should also be non-reactive when exposed to the particular thermal energy storage material 8 contained in the tank 6. For embodiments in which lines 22, 32 comprise copper piping or tubing, the external surfaces may be coated with an acrylic paint and wrapped with a polymer wrap to prevent reaction between the thermal energy storage material 8 and the copper material. As an alternative to the polymer wrap, a paraffin material may be used as a coating over the acrylic coat. Paraffin is expected to work well where the operating temperature of the thermal energy storage material 8 is less than about 140 degrees F., since the melting point of paraffin is about 162-177 degrees F. As a further alternative, lines 22, 32 could be made from a polymer material, such as polyethylene tubing (e.g., PEX tubing). Additionally, polymer coated metal tubing may be used.

The tank 6 and its connections should be sealed from the atmosphere to prevent the evaporation of water from the thermal energy storage material 8 during operation. Large-scale evaporation may cause undesirable changes in the thermal properties. Alternatively, evaporation may be compensated for by providing a level measurement scheme for the tank 6 so that additional water can be added to the thermal energy storage material 8 when a minimum acceptable tank level is detected. Examples of suitable level measurement schemes may comprise a visual line-type indicator, as well as automated level detection systems. Additionally, in response to a low-level indication, supplemental water may be added manually by the user, or via an automated load leveling system.

Lines 22, 32 should be arranged within the tank 6 to serve the entire height of the tank (i.e., they should run almost to the bottom of the tank 6) to avoid solid spots within the material during operation. The lines 22, 32 can have a U-shaped configuration, or they may be coiled.

In one embodiment, the surplus 220 Volt [V] off-peak electrical energy, which is only available for about five hours in the evening, provides the thermal energy for heating the home and hot water needs over a 24 hour day by maintaining all of the water in the hot water tank 10 at about 120 degrees F. The 120 F hot water is circulated into a tube heating coil 32 installed in the tank 6 used for storing the thermal energy storage material 8, thus transferring heat energy to the material 8 (solid to liquid) at a constant 77 degrees F. melting point for storage. When the dwelling thermostat demands more heat, the ATESS compressor 24 and the furnace air circulation fan 44 starts. The refrigerant control valve 26 provides a 40 degrees F. vaporized refrigerant to the evaporator coil 22 which absorbs heat from the 77 degrees F. thermal energy storage material. The compressor 24 elevates the refrigerant temperature to 120 degrees F. to the condensing coil 20, which transfers the heat required at all times during a 24 hour day to the circulating furnace air 46 for home heating. It is noted that this temperature scenario applies where the living space temperature (i.e., the thermostat set temperature) is 70 degrees F. Thus, where cooler or warmer living space temperatures are desired, the system operating temperatures will adjust accordingly.

Figure 2:
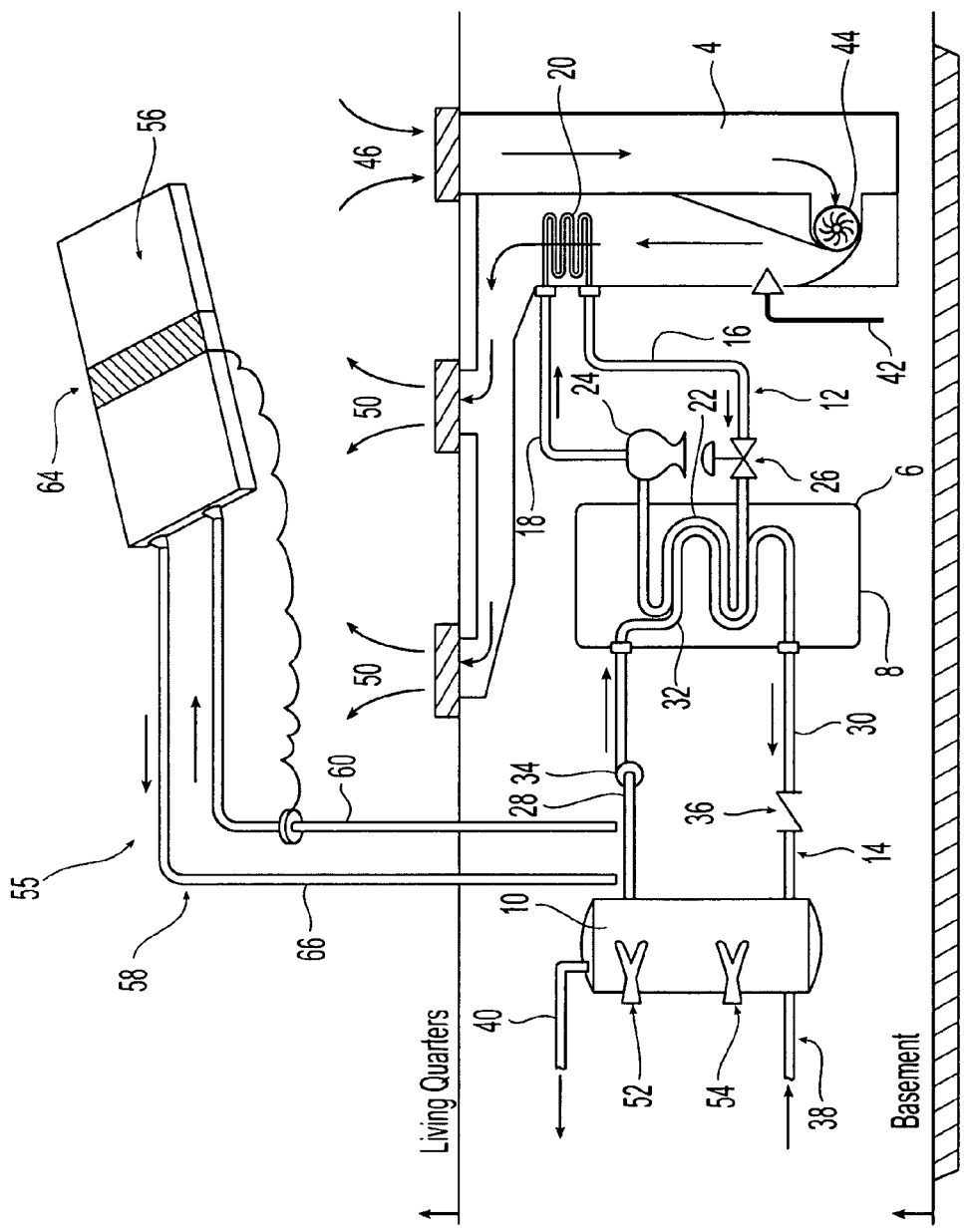
FIG. 2 shows the ATESS installed in a dwelling having an oil or natural gas hot air furnace system supplemented with solar water heating collector panels.

Referring to FIG. 2, an ATESS 55 is shown installed in a dwelling having an oil or natural gas hot air furnace system 4 similar to that described in relation to FIG. 1. In the FIG. 2 system, the energy from the furnace system 4 is supplemented with energy provided by one or more solar water heating collector panels 56. In the illustrated embodiment, a solar panel circulating water loop 58 is integrated into the hot water return piping 30 so that water from the hot water tank 10 can be circulated through the solar energy collector panel 56. A solar panel supply line 60 connects to the hot water return piping 30 between the check valve 36 and the hot water tank 10 to draw water from the tank 10 and/or the output from the heating coil 32. A solar panel circulation pump 62 is disposed in the supply line 60 to provide the motive circulation force for the water. The pumped water passes through the internal passages (not shown) within the solar panel 56, and is heated by the direct energy of the sun. The energy produced by a photovoltaic collector portion 64 of the solar panel 56 is used to power pump 62. The heated water then passes to a return line 66 which directs the water back to the hot water tank 10. The heated water can then be passed through the supply and return piping 28, 30 using recirculation pump 34 so that the heat from the water is transferred to the thermal energy storage material 8 in the tank 6. It will be appreciated that the solar panel 56 may be used to supplement the heat provided by the electrical resistance heaters 52, 54, or on days of particularly direct sunlight, may be used alone to heat the water in the hot water tank.

The energy provided to the thermal energy storage material 8 is thereafter available for use to heat the recirculated air 46 of the furnace, or to heat the hot water contained in the hot water tank 10.

The remainder of the system 55, including the storage tank 6, thermal energy storage material 8, and the connections between the storage tank 6, the hot water tank 10 and the furnace system 4 may all be the same as described in relation to the system 1 of FIG. 1.

In one embodiment, solar energy collected during sunny days as well as surplus off-peak electrical energy provided to the electrical resistance heaters 52, 54 (which, again, may only be available for about five hours in the evenings,) provides the thermal energy to heat the home and hot water needs throughout a 24 hour day by maintaining all the water in the hot water tank 10 at about 120 degrees F. The 120 degree F. hot water is circulated into the tube heating coil 32 installed in the thermal energy storage material tank 6, transferring heat energy to the thermal energy storage material 8 (solid to liquid) at a constant 77 degree F. melting point for storage. When the dwelling thermostat demands more heat, the ATESS compressor 24 and the furnace air circulation fan 44 start. The refrigerant control valve 26 provides a 40 degree F. vaporized refrigerant to the evaporator coil 22 which absorbs heat from the 77 degree F. thermal energy storage material 8. The compressor 24 elevates the refrigerant temperature to 120 degrees F. to the condensing coil 20, which transfers the heat required at any time during a 24 hour day, to the circulating furnace air 46 for home heating.

Figure 3:
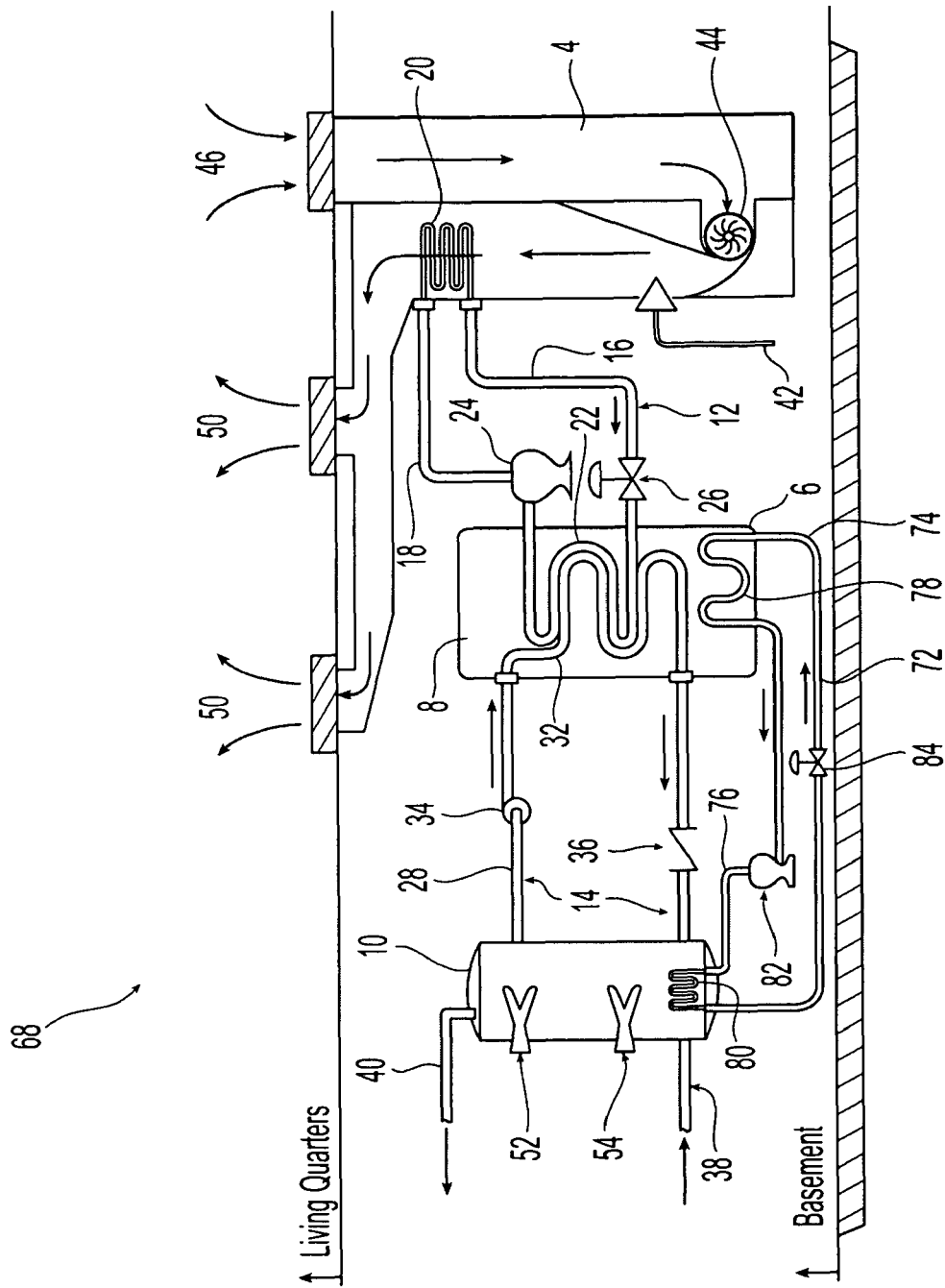
FIG. 3 shows the ATESS installed in a dwelling having an oil or natural gas hot air furnace system and has a separate water heating system (heat pump)

Referring to FIG. 3, an ATESS 68 is installed in a dwelling having an oil or natural gas hot air furnace system 4 as well as a separate water heating system (i.e., a heat pump) 72. The system of FIG. 3 has substantially the same piping, components, and interconnections as described in relation to the system of FIG. 1, but also includes a heat pump system 72 that enables supplemental heating of the water in the hot water tank 10 to accommodate high volume hot water needs during the day and/or night.

Thus, the ATESS 68 of FIG. 3 comprises a furnace system 4, thermal energy storage material tank 6, hot water tank 10, and all related piping and fluid management components described in relation to FIG. 1. As with the systems described in relation to FIGS. 1 and 2, the ATESS 68 heats the thermal energy storage material 8 during off-peak hours by circulating hot water from the hot water tank 10 through the heating coil 32 in the storage tank 6.

The ATESS 68 further comprises an additional closed heating loop 72 having fluid supply 74 and return 76 piping in communication with respective evaporator and condenser coils 78, 80 located within the thermal energy storage material tank 6 and the hot water tank 10. A compressor 82 is located in the supply line 74 and provides the motive force for moving the heat transfer fluid (contained within the piping 74, 76) between the heat transfer coils 78, 80 in the respective tanks 6, 10, thereby transferring heat from the thermal energy storage material 8 to the hot water located in the hot water tank 10. A control valve 84 is located within the return piping 76 to control the flow rate of the heat transfer fluid, thus controlling the amount of heat transferred between the thermal energy storage material 8 and the water in the hot water tank 10.

As with the previously described embodiments, the surplus 220 V off-peak electrical energy, which is only available for about 5 hours during the evening, provides the thermal energy to heat the home and hot water over a 24 hour day by maintaining all the water in the hot water tank 10 at about 120 degrees F. The 120 degree F. hot water (heated by the resistance heaters 52, 54) is circulated into a heating coil 32 installed in the thermal energy storage material tank 6, thus transferring heat energy to the thermal energy storage material (changing it from solid to liquid) at a constant 77 degrees F. melting point for storage. When the dwelling thermostat demands more heat, the ATESS compressor 24 and the furnace air circulation fan 44 starts. The refrigerant control valve 26 provides a 40 degrees F. vaporized refrigerant to the evaporator coil 22 which absorbs heat from the 77 degree F. thermal energy storage material 8. The compressor 24 elevates the refrigerant temperature to 120 degrees F. to the condensing coil 20, which transfers the heat required at all times of a 24 hour day, to the circulating furnace air for home heating. The heat pump system 72 is operable to heat water in the hot water tank 10 at any time of the day, using the stored heat in the thermal energy storage material 8.

Figure 4:
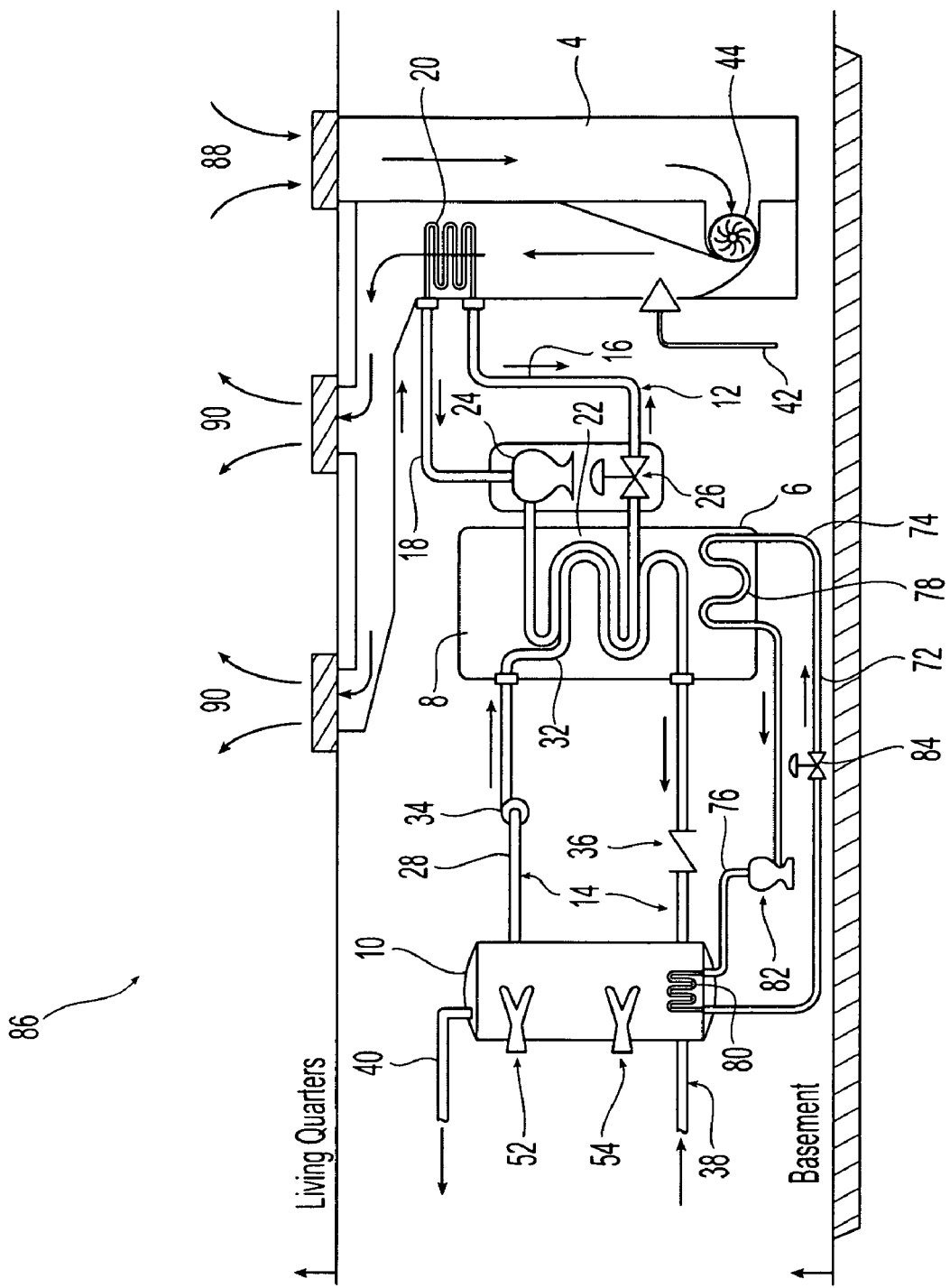
FIG. 4 shows the ATESS installed in a dwelling having an oil or natural gas hot air furnace system and has a separate water heating system (heat pump), and which further comprises a dual control system for use as an air conditioner.

Referring to FIG. 4, ATESS system 86 is installed in a dwelling having an oil or natural gas hot air furnace system 4, and which has a separate water heating system (i.e., a heat pump) 78 similar to that described in relation to the ATESS of FIG. 3. In the embodiment of FIG. 4, however, the ATESS 86 is configured with a control system 87 that may reverse the functions of the components to enable the ATESS 86 to heat or cool the house as desired. Thus, on hot, humid summer days, the ATESS 86 removes heat from the house circulating air 88, and stores that heat in the thermal energy storage material 8 for heating water for home use or home heating. The cooled air 90 is then recirculated through the dwelling.

The ATESS 86 of FIG. 4 comprises a furnace system 4, thermal energy storage material tank 6, hot water tank 10, as well as all related piping and fluid management components described in relation to FIG. 3. As noted, the ATESS 86 further comprises a control system 87 operable to reverse the flow of heat transfer fluid between the storage tank 6 and the coil 20 of the furnace system 4. This flow reversal may be implemented by providing an appropriate piping arrangement for redirecting the flow of the heat transfer fluid according to a desired series of valve settings. Thus, in a "heating" setting, the flow of heat transfer fluid would be through lines 16 and 18 in the direction of arrows "A," and would be functional for heating the dwelling air 88. In the "cooling" setting, the flow of heat transfer fluid would be through lines 16 and 18 in the direction of arrows "B," and would be functional for cooling the dwelling air 88. Suitable electronics may be provided to automatically actuate and control the direction and flow rate of the heat transfer fluid through lines 16 and 18.

Where the system 86 is used for cooling the dwelling air 88, particularly during the hot summer months in southern portions of the northern hemisphere, an outdoor evaporator coil and fan may be provided in communication with the heat transfer storage material 8. This arrangement may be of advantage where the thermal energy storage material 8 has met its maximum capacity for storage of rejected air conditioning heat, since it providing a path for rejecting excess heat to the outdoors.

In an alternative embodiment, in lieu of a special piping arrangement for redirecting flow, compressor 24 could be a reversible compressor, and control valve 26 could be of a design that provides a desired degree of flow control regardless of the direction of flow past the seat. Additionally, in lieu of control valve 26 a pair of control valves could be provided, one for controlling refrigerant flow rate when heat is needed in winter or on cool summer evenings, and a second to control refrigerant flow if heat needs to be removed from the dwelling in the summer. Suitable known control electronics may be provided to enable automatic selection of a flow direction.

As with the previously-described embodiments, the ATESS 86 of FIG. 4 operates to store energy in the thermal energy storage material 8 during periods in which such storage is most efficient. In one embodiment, energy removed from the hot air 88 of the living space is transferred to the storage material 8 via the compressor 24, control valve 26 and piping 16, 18 arrangement previously described. The stored energy may then be used to heat water (in a manner previously described) immediately or at a later time, or to heat the air circulated through the furnace system 4 at a later time, as needed.

Figure 5:
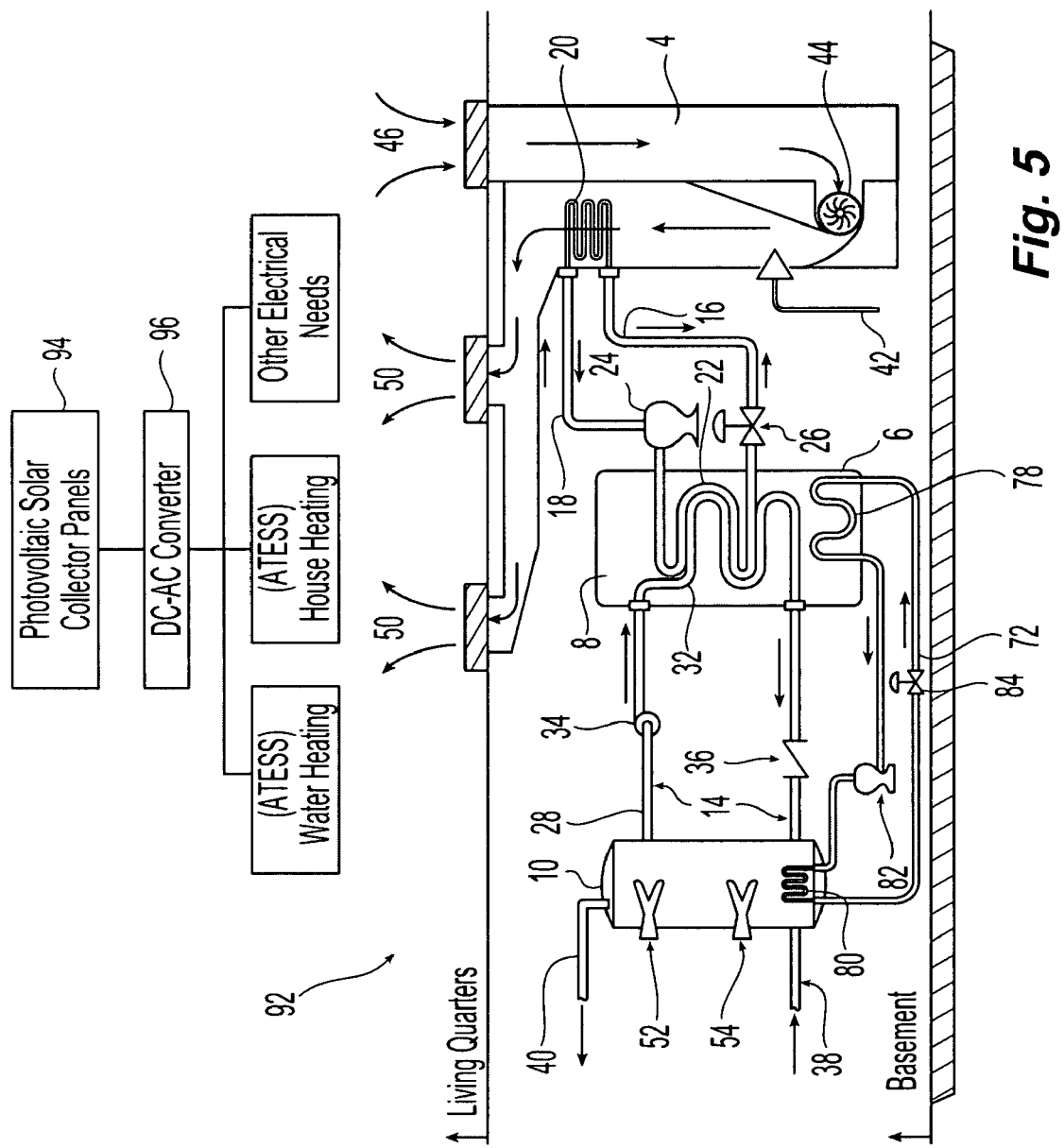
FIG. 5 shows the ATESS described in FIG. 3 with photovoltaic solar collection panels for cold winter weather operation.

Referring to FIG. 5, ATESS system 92 has substantially the same piping and components as the system 68 described in relation to FIG. 3, and further comprises one or more photovoltaic solar collection panels 94 to provide additional water and air heating for cold weather operation, such as in winter. The one or more solar collection panels 94, employing known photovoltaic principles, may produce direct current (DC) electricity, which may then converted to alternating current (AC) electricity by a suitable AC/DC converter 96. The resulting AC electricity may then be connected to the appropriate home or building power supply circuits. A step-up or step down converter (not shown) may also be required to match the home or building power supply circuit. The electricity from the solar panels 94 may be provided directly to the resistance heaters 52, 54 that provide thermal energy to the water contained in the hot water tank 10. This energy may then be transferred to the thermal energy storage material via lines 28, 30 and heating coil 32, in a manner previously described in relation to the systems of FIGS. 1-4.

The system of FIG. 5 is particularly well suited to use in cold weather regions. Thus, when the cold weather season arrives, the available daytime solar power generated by the solar collection panels 94 may be used to heat water in the hot water tank for house use, and also to store the (now converted) electrical energy in the thermal energy storage material 8 using ATESS 92. The ATESS 92, in a manner similar or identical to that described in relation to FIG. 3, may then be used to heat the home and to meet hot water needs during any portion of a 24 hour day. The off-peak surplus electric power would be back-up energy during cloudy or limited sunny days for the net thermal energy needed to heat the residential dwelling or commercial building and/or water.

Figure 6:
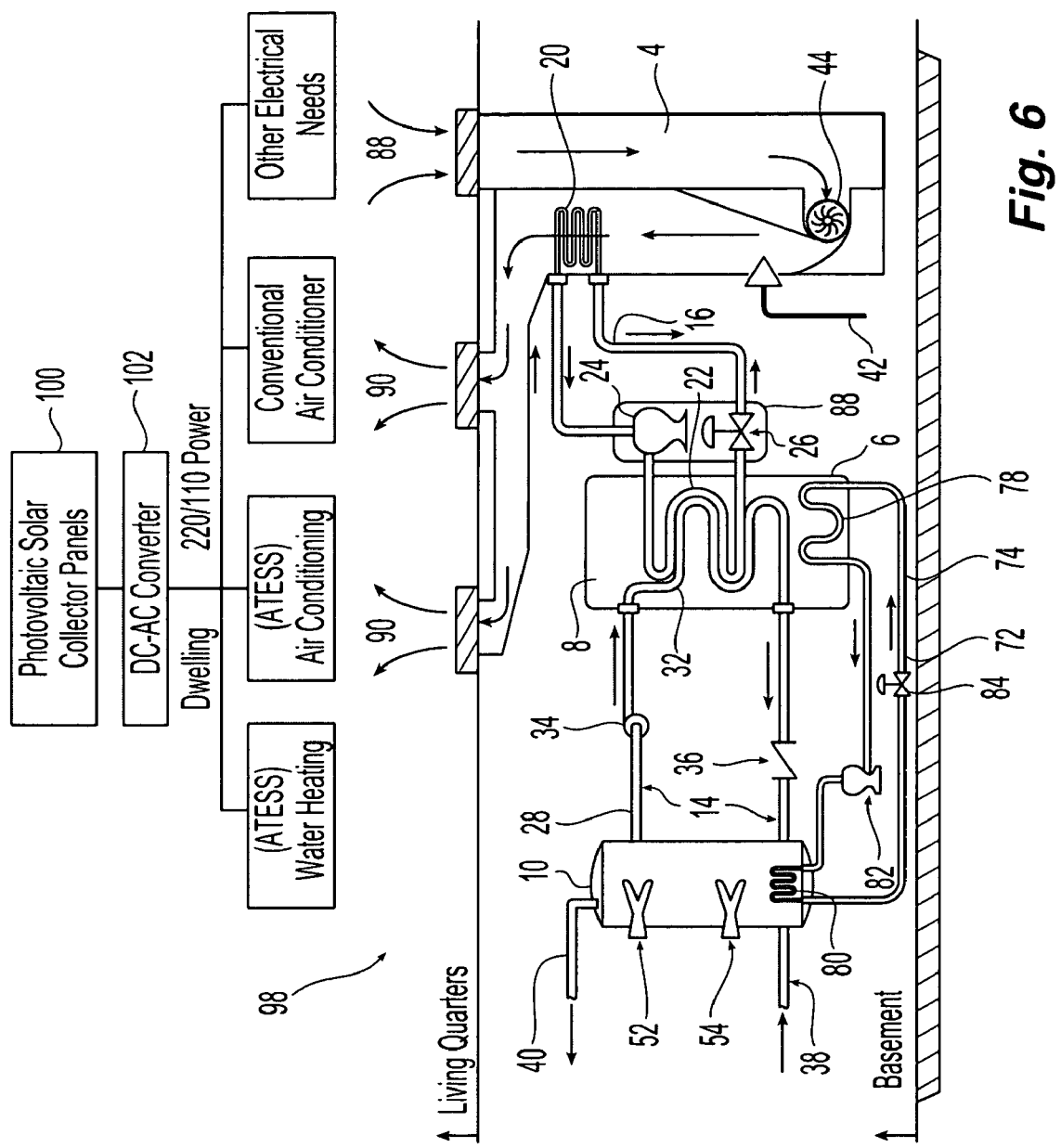
FIG. 6 shows the ATESS described in FIG. 4 with photovoltaic solar collection panels for hot summer weather operation.

Referring to FIG. 6, ATESS system 98 has substantially the same piping and components as the ATESS 86 described in relation to FIG. 4, and further comprises one or more photovoltaic solar collection panels 100 for hot summer weather operation. The one or more solar collecting panels 100 using known photovoltaic principals, may generate direct current (DC) electricity, which may then be converted to alternating current (AC) using a voltage converter 102, thus enabling connection with the home or building electric power supply. When the hot, humid, weather season arrives, the electric power generated by the solar collection panels 100 may be used to operate the conventional air conditioning system, which operates in conjunction with the reversible ATESS 86 system described in relation to FIG. 4 to cool the air 88 in the living space.

A storage tank 6 for use in a typical dwelling may be approximately 400 gallons in volume, and may contain an energy storage material such as that described in U.S. Pat. No. 3,976,584 to Leifer. Other appropriate thermal energy storage materials may be tetra iso-amyl ammonium fluoride. 38 $H_2O$, tetra n-butyl ammonium fluoride. 18 $H_2O$ (Clathrate Materials). Additionally, the following Non-Clathrate Materials may also be used: imidazole, imidazolium chloride, derivatives of pyrrole, such as 2-acetyl pyrrole or tetra methyl pyrrole, or other like compounds. The heating coils 22, 32, 78 may be made of corrosion resistant materials suitable for carrying approximately 120 degree F. water in operation. The total heat stored in the approximate 400 gallons of thermal heat storage material would heat a home of approximately 1600 square feet of living space maintaining a temperature of approximately 70 degrees F. in the most northern latitudes of the United States daily throughout the year. The heat stored in the approximate 400 gallon tank 6 of thermal energy storage material 8 for heating the home would also heat water in an approximate 60 gallon insulated hot water tank 10 to a desired 115 degrees F. to 120 degrees F. temperature for normal family hot water usage.

The ATESS may be provided with an appropriate computer control system for controlling the heat pump system 72, furnace system 4, recirculation pumps 34, 62 compressor 24, control valve 26, and resistance heaters 52, 54 to enable the ATESS to perform as desired to compliment the oil or natural gas heating system and/or water heating system needs of a commercial or residential building. The control system would also control the dwelling heat transfer (i.e., heat pump) system as a dual system to remove heat from the air circulating in the furnace duct system during the hot and humid summer days, and to that heat in the thermal energy storage material stored in the storage tank 6. The system may be used in conjunction with a conventional electric powered air conditioning system during the hot-humid summer months.

It will also be appreciated that the ATESS may be integrated into a mobile platform to aid in the transport of perishable commodities such as orange juice and the like. Thus, the ATESS may be sized and configured for installation in railroad cars, trucks, planes, container/cargo ships or other transportation platforms. In one example, the ATESS may be combined with solar panels or fuel oil to reduce oil consumption in ocean going passenger ships.

Further, the ATESS may be used as part of a system for reducing the energy consumption required for any of a variety of industrial processes that require substantial energy, such as soup making, and the like.

In yet another embodiment, the ATESS may be used to advantage in applications such as commercial/personal ice skating or hockey rinks.

Advantages

The Northeast area of the United States has the larger number of homes and commercial buildings heated by oil and liquefied natural gas (LPG). Due to the lack of major natural gas pipelines serving the area, liquefied natural gas is imported through major seaports in the Northeast by huge tankers from foreign countries, which could be a terrorist threat to the security of our seaports. The conversion to ATESS of homes and commercial buildings to electric off peak power or solar energy would eliminate these shipments and the associated threats to our seaports.

The United States currently imports approximately 40% of its domestic oil needs from foreign countries. The ATESS system can substantially reduce or eliminate the need for foreign oil.

ATESS can also reduce the need to heat residential dwellings or commercial buildings with oil and natural gas. ATESS can reduce daytime peak electric power demands during hot and humid weather.

ATESS can store solar thermal energy available during the daytime for use during day or night for energy needs of residential dwellings or commercial buildings. ATESS, if widely used in residential dwellings and commercial buildings, will allow electric power generation networks to practice load leveling between peak daytime and surplus off-peak night time electric power demands.

Laboratory Test Results for Various Thermal Energy Storage Materials

The inventors have conducted laboratory tests to determine the melting point, heat of fusion and safe operating temperature range of several materials considered suitable for use as thermal energy storage material 8. The results of the inventors' tests are shown in Table 1 below. In addition to the specific clathrate material the inventors used in their tests, other potentially useful clathrate materials exist and are noted herein. These materials include: tetra iso-amyl ammonium fluoride 38 $H_2O$, which has a melting point of 88 degrees F., and tetra n-butyl ammonium fluoride 18 $H_2O$, which has a melting point of 98.6 degrees F. It should be noted that some of the other thermal energy storage materials identified in Table 1 below have melting points much greater than 77 degrees F. The use of these higher melting point materials in any one of the previously described ATESS systems may preclude the need for a heat pump system 72.

TABLE 1

Physico-Chemical Results of Potential Tested Thermal Energy Storage Materials

| Materials | Melting Point (degrees F.) | Heat of Fusion (BTU/lbs) | % Heat of Fusion of Water (%) | Safe Operating Range (degrees F.) |
|---|---|---|---|---|
| TESM 1[1] | 77 | 108 | 75% | 77-140 |
| Imidazole | 194 | 75 | 52% | 194-320 |
| Imidazolium Chloride | 320 | 60 | 42% | 320-375 |
| 2-Acetylpyrrole | 195 | 77 | 54% | 195-260 |

[1]"TESM 1" was (n-$C_4H_9$) 4NF 32.8 $H_2O$

Note that the "Safe Operating Range" indicated in Table 1 represents, for each TESM, a temperature range between the melting point of the TESM and a point approximately 5-20 degrees F. below the decomposition temperature of the particular TESM.

Test Site Results

Figure 7:
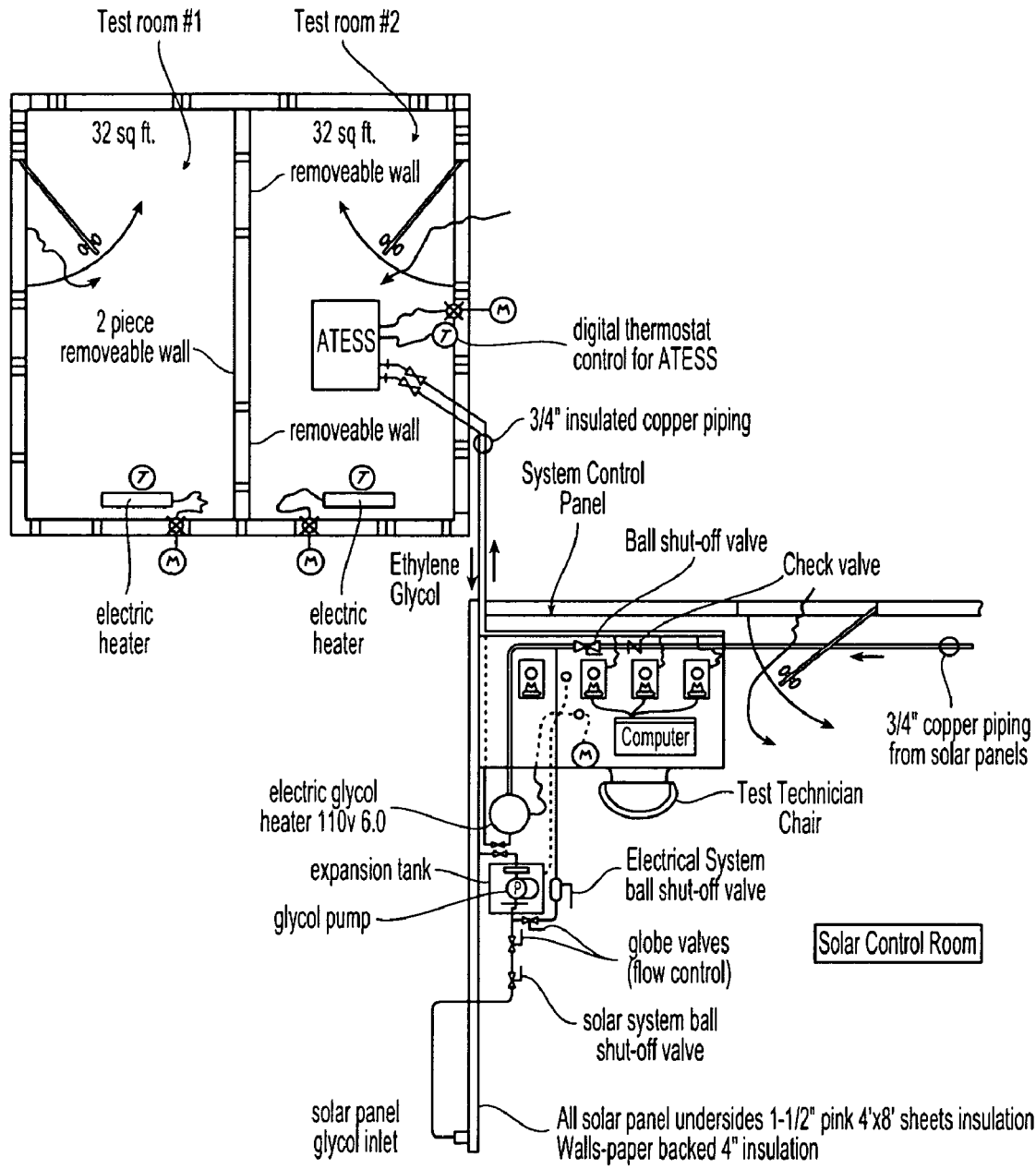
FIG. 7 is a schematic an arrangement of an ATESS test facility used to test system and thermal energy storage material efficacy.

Referring to FIG. 7, a test site building was constructed as a horizontal duplex, with each room (Rooms #1 and #2) being approximately 32 square feet. Room #1 was heated conventionally, while Room #2 was heated using the ATESS. The inventors used 40 lbs of Thermal Energy Storage Material (TESM) 8, which in this case was (n-$C_4H_9$) 4NF 32.8 $H_2O$, and which will be referred to hereinafter as "TESM 1." The TESM 1 was contained in TESM 1 tank 6. For the purposes of the test, the tank 6 was a 5 gallon polyethylene tank. Internal piping was copper, coated with acrylic coating and wrapped with a polymer film. The tank 6 connections were sealed from the atmosphere using tape to prevent evaporation. The 40 lbs. of TESM 1 stored heat energy from two (2) limited sources in these tests. Source 1 was evening off peak electricity and Source 2 was daytime solar energy. The solar heat collection system worked well, but due to the lack of sunny days during the test, the inventors simulated the daytime solar heat by using metered daytime electric power. Both sources were limited to four (4) hours per cycle for the tests. The ATESS in Room #2 was a scaled down version of the ATESS previously described in relation to FIG. 2.

FIG. 8 shows the results of 14 days of testing. Days 1, 2, and 3 were conducted to determine the heat required to maintain a consistent temperature in Rooms #1 and #2. The results of these tests show the heat required to maintain the same temperature in Rooms #1 and #2 are essentially the same.

FIG. 8 also shows test days #4 through #14 which were conducted using only the ATESS heating system as a primary heat source for Room #2. Test days #4 and #5 were not considered in the results because those days used 3.0 and 3.5 hour heating cycles to transfer heat to the TESM, and these shorter cycle times were deemed not to be long enough for transfer of an adequate amount of heat to TESM 1 for storage during the tests. The remaining test days (#6 to #14) used four (4) hour TESM heating cycles. The results show that ATESS heating system works very well to maintain the temperature in Room #2 at a nominal 70 degrees F. (temperature actually ranged from about 68-71 degrees F.) without the use of any conventional additional heat from fuel oil or gas. During the December and January tests, the outside air temperature fluctuated from a low of 12 degrees F. to a high of 47 degrees F.

FIG. 9 shows the performance of the ATESS heating system hour by hour during a 24-hour day. The results in FIG. 9 were compiled for an optimum day (i.e., one close to the mean of test days 6-14) using the ATESS. The results show energy from two (2), limited sources (i.e., evening off peak electricity and daytime solar) being distributed as needed to test Room #2 in order to maintain a desired temperature. Some heat from the ATESS control system, compressor motor losses, and heat of compression from the compressor were also added to Room #2. The limited source energy from non-peak electric and solar was stored in the TESM 1 during the limited 4 hour cycles and then distributed to Room 2 by the ATESS heat pump system. The heat needed to maintain 70 degrees F. in Room 2 was controlled by the thermostat of the ATESS system.

The results tabulated in FIGS. 8 and 9 show heat pump inefficiencies of our system design which can be substantially improved by an experienced heating and ventilation equipment manufacturer. For example, the ATESS system prototype heat pump evaporator coil comprised single diameter copper tubing. An experienced HVAC engineer could design an evaporator coil having a varied diameter in order to maintain a constant evaporator refrigerant temperature of approximately 40 degrees F. across the entire coil. Additionally, the prototype heat pump system had less than optimal electric compressor motor efficiency, which may be improved greatly in large system designs using either AC or DC electric power. Additionally, modern control systems applied to a large-scale ATESS would use little electric power as compared to the prototype system. The ATESS heating system inefficiency is indicated in FIGS. 8 and 9 as extra heat added to room #2 ("Motor Loss and Extra Room Heat Demand") to maintain the desired temperature.

The inventors consider that to install an operational ATESS into a full size residential home having 1600 sq ft. of living area would require a 50:1 scale up to replicate the results shown at the test site. FIGS. 10A-C show the daily fuel oil and LPG (liquid propane gas) consumption for such a residential home. In addition, FIGS. 10A-C shows a comparison of the annual winter heating costs for: a) fuel oil, b) LPG, and c) the ATESS heating system using: 1) off peak electric and daytime solar, 2) all off peak electricity, and 3) all daytime solar.

The results indicate a substantial cost savings can be achieved through use of the ATESS. For example, the annual cost for fuel oil using a 125 day annual winter heating cycle is estimated to be about $1,813, while the annual cost for LPG also using a 125 day annual winter heating cycle is estimated to be $1,932. (These estimated costs where calculated using estimates of $2.55/gallon of fuel oil and $1.86/gallon of LPG.) By comparison, the annual heating cost using the ATESS for the 125 day annual winter heating cycle with: 1) off peak electric and daytime solar is estimated to be about $1,048; 2) all off peak electric is estimated to be about $1,348; and 3) all daytime solar is estimated to be about $748. Thus, it can be seen that there would be a considerable savings with the use of the ATESS as compared to conventional heating methods. This savings can be increased by adding accessories to heat water.

For example, during hot summer months, heat may be removed from the dwelling space (via air conditioning) and stored in the TESM. Appropriate piping and pumping equipment (e.g., items 72, 83 in FIG. 4) may be added to the ATESS to allow transfer of this stored heat from the TESM 8 to the hot water in the hot water tank 10 to maintain a desired temperature (e.g., 130 degrees F.). Heating the hot water in this manner may eliminate or reduce the need to use expensive daytime electric, fuel oil or LPG.

FIGS. 10A-C further show the gallons per day of fuel oil and LPG as well as the total annual costs for a 125 day winter heating season.

In addition to the aforementioned cost savings, the use of the ATESS may also result in substantial reductions in pollutants emitted to the atmosphere as compared to conventional heating systems. For example, the burning of fuel oil (for the annual heating season) emits to the atmosphere 3,831 lbs of carbon and 14,060 lbs of $CO_2$ per residence (again assuming a 1600 square foot living space). The burning of LPG emits 2,927 lbs of carbon and 10,742 lbs of $CO_2$, for the same size living space. The ATESS, by contrast, emits no carbon or $CO_2$ to the atmosphere. These results are clearly shown at the bottom of FIG. 10C.

SUMMARY

The inventors have shown that using the disclosed ATESS heating system as a compliment or a primary heating system:

(1) Substantially reduces the need for fuel oil and/or liquid petroleum gas (LPG) for heating homes or industrial buildings.

(2) Substantially reduces both carbon and carbon dioxide ($CO_2$) emissions which contributes to global warming.

(3) Substantially reduces the need to transport surplus generated off peak electrical power from local grids, because it can be stored in the TESM for use at anytime during a 24-hour day.

(4) ATESS heating systems allow for the use of solar energy obtained during daylight hours because it can be stored in the TESM for use anytime during a 24-hour day. ATESS will also reduce the number of solar panels required to be installed to provide needed energy for a dwelling or industrial building.

(5) ATESS heating systems, as proven in the inventors' prototype tests, would considerably reduce the country's dependence on foreign oil and LPG, thereby improving homeland security.

Although the invention has been described in terms of exemplary embodiments it will be apparent to those skilled in the art that various changes and modifications can be made thereto without departing from the spirit and scope of the invention.

The invention claimed is:

1. A method for operating an energy storage system, comprising:
providing a first volume of heat transfer fluid;
providing a second volume of thermal energy storage material (TESM), the TESM comprising a substantially solid material having a melting point above 32 degrees Fahrenheit (F), and a latent heat of fusion approaching that of water; and
providing a heating coil in contact with the second volume;
circulating the heat transfer fluid through the heating coil in the second tank;
wherein the step of circulating the heat transfer fluid transfers heat from the heat transfer fluid to the TESM when the temperature of the TESM is less than the temperature of the heat transfer fluid; and wherein the step of circulating the heat transfer fluid transfers heat from the TESM to the heat transfer fluid when the temperature of the TESM exceeds the temperature of the heat transfer fluid.

2. The method of claim 1, further comprising the step of heating the heat transfer fluid using a heater.

3. The method of claim 1, further comprising:
providing a solar panel having a fluid-filled recirculation loop in fluid communication with the heating coil of the second tank; and
moving the heating fluid through the recirculation loop and through the heating coil to transfer heat from the heating fluid to the TESM.

4. The method of claim 1, further comprising:
providing an air conditioning loop for moving an air conditioning fluid between a first air conditioning coil disposed in said second tank and a second air conditioning coil disposed in a ventilation supply opening; and
moving the air conditioning fluid within the air conditioning loop to transfer energy between the TESM and air directed over an outer surface of said second air conditioning coil.

5. The method of claim 4, further comprising controlling a flow rate of said air conditioning fluid through said air conditioning loop using at least one of a compressor and a control valve.

6. The method of claim 5, further comprising operating the compressor in a first operating mode to move the air conditioning fluid through the air conditioning loop in a first direction, and operating the compressor in a second operating mode to move the air conditioning fluid through the air conditioning loop in a second direction opposite to said first direction.

7. The method of claim 1, wherein the TESM comprises a material selected from the group consisting of clathrate, imidazole, imidazolium chloride and a derivative of pyrrole.

8. A method for operating an energy storage system, comprising:
providing a first tank for holding a quantity of fluid;
providing a second tank having a quantity of thermal energy storage material (TESM) disposed therein, the TESM comprising a substantially solid clathrate having a melting point above 32 degrees Fahrenheit (F); and
providing a fluid connection loop between the first and second tanks, the fluid connection loop being in fluid communication with the first tank and comprising a heating coil disposed within the second tank;
moving the fluid within the fluid connection loop to transfer heat from the fluid in the first tank to the TESM in the second tank when the fluid in the first tank has a temperature greater than a temperature of the TESM; and
moving the fluid within the fluid connection loop to transfer heat from the TESM in the second tank to the fluid in the first tank when the TESM has a temperature greater than the temperature of the fluid in the first tank.

9. The method of claim 8, further comprising heating the fluid in the first tank using a heater.

10. The method of claim 8, further comprising:
providing a solar panel having a fluid-filled recirculation loop engaged with the fluid connection loop; and
moving the fluid within the recirculation loop and the fluid connection loop to transfer heat from the solar panel to the TESM.

11. The method of claim 8, further comprising:
providing an air conditioning loop comprising a first air conditioning coil disposed within said second tank and a second air conditioning coil disposed within a building ventilation supply opening; and
moving an air conditioning fluid within said air conditioning loop to transfer energy between the TESM and air directed over an outer surface of the second air conditioning coil.

12. The method of claim 11, further comprising operating at least one of a compressor and a control valve to control a flow rate of said air conditioning fluid through said air conditioning loop.

13. The method of claim 12, further comprising operating the compressor in a first operating mode to move said air conditioning fluid through said air conditioning loop in a first direction, and operating the compressor in a second operating mode to move the air conditioning fluid through said air conditioning loop in a second direction opposite to said first direction.

14. The method of claim 8, wherein the TESM comprises a material selected from the group consisting of clathrate, imidazole, imidazolium chloride and a derivative of pyrrole.

15. A method for operating a thermal energy storage system, comprising:
providing a first tank, a second tank, and an air distribution system; the first tank having a quantity of water disposed therein; and the second tank having a quantity of Thermal Energy Storage Material (TESM) disposed therein, the TESM comprising a phase change material having a melting point above 32 degrees Fahrenheit (F), and a latent heat of fusion approaching that of water;
moving water between the first and second tanks via a recirculation loop, the recirculation loop comprising at least a first coil disposed in the second tank;
moving a first heat transfer fluid between the second tank and the air distribution system via an air conditioning loop comprising a first air conditioning coil disposed in the second tank and a second air conditioning coil disposed in the air conditioning system to transfer energy between the TESM and air passed over the second air conditioning coil.

16. The method of claim 15, further comprising:
providing a heat pump loop comprising a second heat transfer coil disposed within the first tank, and a third heat transfer coil disposed within the second tank; and
moving a second heat transfer fluid within the heat pump loop to transfer energy between the TESM in the second tank and the water in the first tank.

17. The method of claim 16, further comprising:
operating at least one of a first compressor and first control valve to control movement of the heat transfer fluid through said air conditioning loop, and operating at least one of a second compressor and a second control valve to control movement of the second heat transfer fluid through the heat pump loop.

18. The method of claim 17, wherein the first compressor is a reversible compressor.

19. The method of claim 15, further comprising:
providing a solar panel having a solar panel fluid loop in fluid communication with the recirculation loop between the first and second tanks; and
moving fluid within the solar panel fluid loop and through the recirculation loop to transfer energy from the solar panel to the TESM.

20. The method of claim 15, further comprising:
providing a solar panel for generating a current for electrical power, and
heating the first tank using a heater powered by said electrical power.

21. The method of claim 15, wherein the TESM comprises a material selected from the group consisting of clathrate, imidazole, imidazolium chloride and a derivative of pyrrole.

22. The method of claim 15, wherein the TESM comprises clathrate.

23. A method of operating a thermal energy storage system, comprising:
providing a first volume of heat transfer fluid;
providing a second volume of Thermal Energy Storage Material (TESM), the TESM comprising a phase change material having a melting point above 32 degrees Fahrenheit (F), and a latent heat of fusion approaching that of water;
providing a radiator circulation system;
moving the heat transfer fluid through a first coil in contact with the TESM to transfer energy between the heat transfer fluid and the TESM; and
moving a second heat transfer fluid from a second coil in contact with the second volume to a third coil disposed in the radiator circulation system to transfer energy between the TESM and a fluid passed over the third coil.

* * * * *